(No Model.) 3 Sheets—Sheet 1.

T. TAYLOR.
ROLLER HOLDER FOR PHOTOGRAPHIC FILMS.

No. 414,735. Patented Nov. 12, 1889.

Witnesses
E. D. Smith
Thomas Durant

Inventor
Thomas Taylor
By his Attorneys
Church & Church (No Model.) 3 Sheets—Sheet 2.
T. TAYLOR.
ROLLER HOLDER FOR PHOTOGRAPHIC FILMS.
No. 414,735. Patented Nov. 12, 1889.
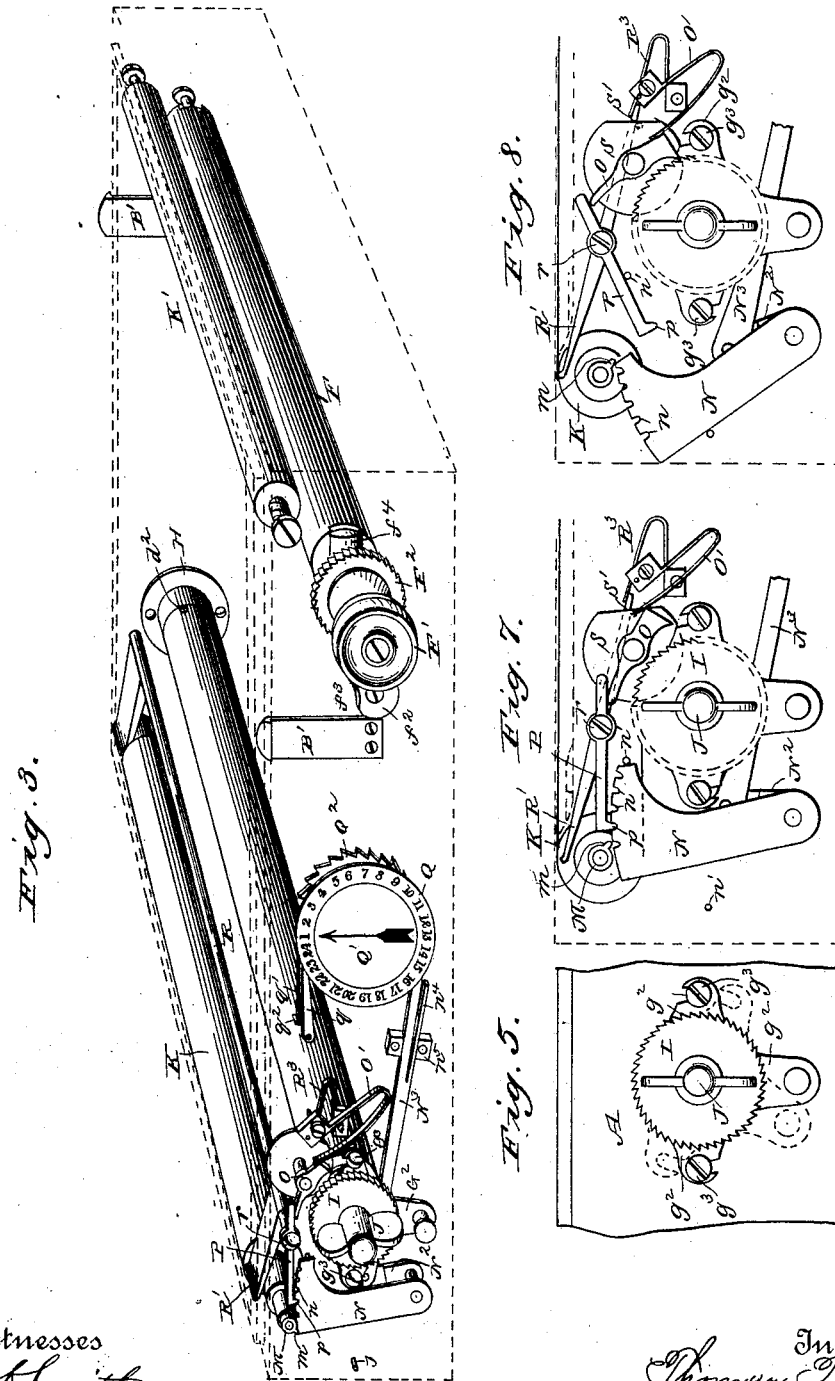
Witnesses
E. D. Smith
Thomas Durant
Inventor
Thomas Taylor
By his Attorneys
Church & Church (No Model.) 3 Sheets—Sheet 3.
T. TAYLOR.
ROLLER HOLDER FOR PHOTOGRAPHIC FILMS.
No. 414,735. Patented Nov. 12, 1889.
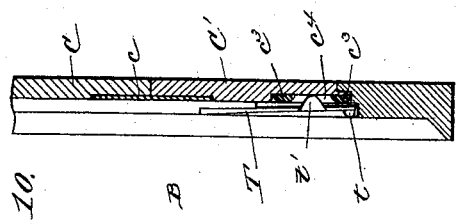
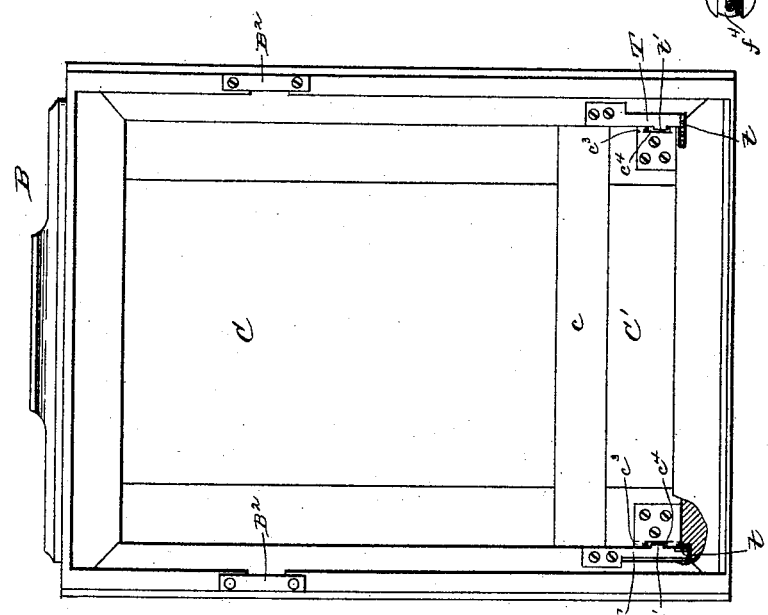
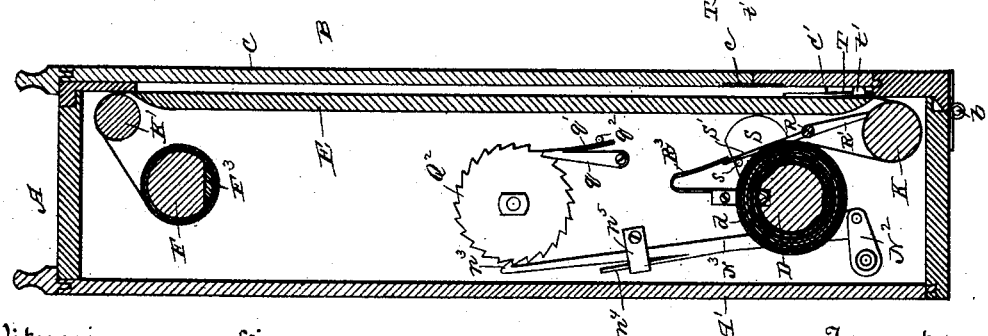
Witnesses
E. L. Smith
Thomas Durant
Inventor
Thomas Taylor
By his Attorneys
Church & Church

UNITED STATES PATENT OFFICE.

THOMAS TAYLOR, OF GLASGOW, SCOTLAND, ASSIGNOR TO THE EASTMAN DRY PLATE AND FILM COMPANY, OF ROCHESTER, NEW YORK.

ROLLER-HOLDER FOR PHOTOGRAPHIC FILMS.

SPECIFICATION forming part of Letters Patent No. 414,735, dated November 12, 1889.

Application filed April 8, 1889. Serial No. 306,353. (No model.)

*To all whom it may concern:*

Be it known that I, THOMAS TAYLOR, of Glasgow, Scotland, have invented certain new and useful Improvements in Roller-Holders for Photographic Films; and I do hereby declare the following to be a full, clear, and exact description of the same, reference being had to the accompanying drawings, forming a part of this specification, and to the figures and letters of reference marked thereon.

My invention relates to certain improvements in roller-holders for exposing in the camera flexible sensitized photographic film, and has for its object to improve their construction and operation by reducing the liability of exposing a second time exposed portions of the film, or of reeling forward more film than is required for an exposure; and the invention consists in certain novel constructions and combinations of parts, all as will be hereinafter fully described, and the novel features pointed out in the claims at the end of this specification.

Figure 1:
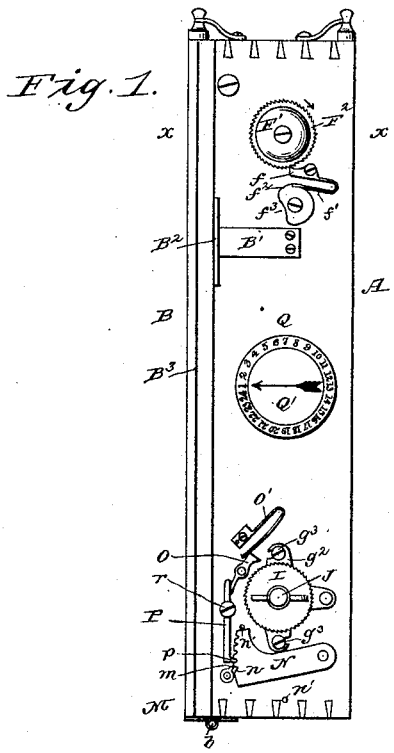
Figure 2:
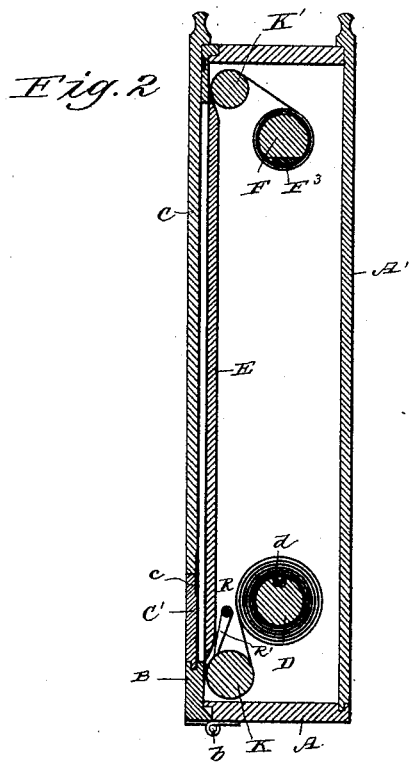
Figure 4:
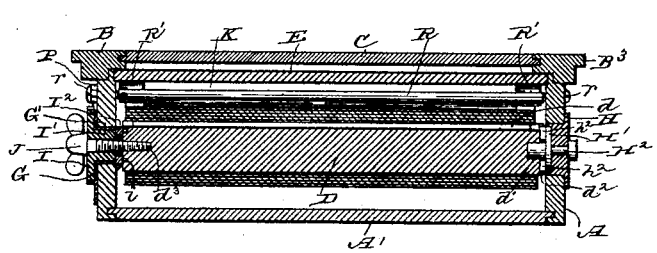

In the accompanying drawings, Figure 1 is a side view of a roller-holder constructed in accordance with my invention; Fig. 2, a longitudinal sectional view of the same; Fig. 3, a perspective view of the operating parts, the casing being indicated in dotted lines; Fig. 4, a sectional view through the film-spool on the line $x\ x$ of Fig. 1; Fig. 5, a side view of the spool-holding devices, showing in dotted lines the position occupied by the parts when the spool is to be removed; Fig. 6, a longitudinal sectional view looking toward the side of the casing presented in Fig. 1, showing the operation of the indicator and ink-marker; Figs. 7 and 8, detail side views showing the operation of the ink-marker; Fig. 9, a plan view of the inside of the casing-front; Fig. 10, a sectional view on the line $y\ y$ of Fig. 9. Fig. 11 is a view of the winding-reel, showing the means for the attachment of the end of the film.

Similar letters of reference denote similar parts.

A represents the casing of the holder, its rear side provided with a slide A', operated in suitable grooves, forming a light tight connection, and a front B, hinged at one end to the casing upon hinges $b$ and fastened at the other end to the casing by spring-catches B' on the latter, co-operating with plates B². This front B is provided with suitable grooves at the side, in which the exposing-slide C operates, which latter has its forward end portion C' connected to it by a flexible hinge $c$, so that the slide can be moved out sufficiently far to expose the film, and then the portion C folded back against the casing, leaving the end C' in the grooves.

B³ represents flanges formed on the front, adapted to engage the grooves formed in the back of the camera for the accommodation of the holder, though any other form of holding device could as well be employed.

Within the body of the casing A are located the supply-spool D, the film support or table E and the winding-reel F, necessary in apparatus of this description for containing the unexposed film, supporting it while being exposed and reeling up the exposed portion, drawing forward a new supply in position to be exposed.

The supply-spool for containing the unexposed film consists of a roller D, having a groove in its surface, in which the end of the film is clamped by a V-shaped strip $d$, inserted therein in a fold of the paper, and at one end it is provided with a recess $d'$ and radial slots $d^2\ d^2$, and at the other with a threaded recess $d^3$, and the support for said spool at one end consists of a plate H, secured to the casing, having a recess on its inner side, in which operates a disk H', adapted to turn therein with slight friction, provided with projections $h^2\ h^2$, co-operating with the slots $d^2\ d^2$ on the spool, and secured to the center of said plate is a pin H², adapted to enter the recess $d'$ in the spool, though held from free rotation in the plate. At the other end of the spool is provided a plate G, having a boss G' on its inner side adapted to fit a corresponding aperture in the casing, and slotted arms $g^2$ at the sides, the slots in which are adapted to engage the necks of screws $g^3$ $g^3$ on the casing, when the boss is inserted in the aperture in the casing and the plate turned.

I represents a toothed wheel having a sleeve

I' formed thereon, passing through the plate G, and provided on its inner end with a collar I², in which are formed three or more sharp projections $i\ i$, adapted to enter the end of the spool when in position between it and the disk H', causing the wheel I to rotate with the spool when the film is withdrawn therefrom. For the purpose of properly centering the spool and also attaching it more firmly to the wheel I, a thumb-screw J is passed through the sleeve I', arranged to enter the recess $d^3$, and when tightened up will draw them tightly together. The recess $d^3$ need not be threaded, as the screw, being slightly tapering, will form its own thread in the soft wood of which the spool is composed, and by this means I am enabled to use the spools of film now on the market adapted for use in the roller-holders manufactured by the Eastman Dry Plate and Film Company.

The support or table E over which the film passes and upon which it is supported during exposure is preferably removable, resting at the edges upon slight recesses formed at the sides of the casing, and at its ends are provided guide-rollers K K', journaled on screws on the casing over which the film passes, the former serving also as a "measuring-roll," so called, for indicating the amount of film wound forward over the support after an exposure has been made.

The winding-reel, lettered F in the drawings, is secured in the casing so as to rotate freely, and is provided with an operating-handle F', extending to the exterior of the casing, and a toothed wheel F², with which co-operates a pawl $f$, pivoted on the casing and held in contact by a spring $f'$, formed upon or attached to it, the free end of said spring operating against a disk $f^2$, pivoted upon the casing and provided with a cut-away portion $f^3$, adapted, when turned in one position, to permit the pawl to be turned backward out of engagement with the wheel F², allowing the motion of the latter to be reversed, if desired. In Fig. 1 the devices are in normal position, and when the film is to be wound up the handle is turned in the direction of the arrow, the pawl slipping over the teeth; but all backward movement will be prevented by said pawl, thus keeping the film under tension and holding it flat on the support. The friction between disk H' and plate H also serves as a brake, keeping an even tension on the paper and preventing unwinding save when drawn forward by the reel. The end of the film may be attached to the reel in any desired manner—such, for instance, as shown in Patent No. 317,050, dated May 5, 1885; but I prefer to employ a bar F³, provided at the end with small slotted plates $f^4$, arranged to slide in recesses in the reel-ends, and the manner of securing the film will be understood from an inspection of Fig. 11, in which the end is shown as passed beneath the bar and bent over on top; then as the reel is rotated the film will be wound on it, each successive layer holding the bar down more firmly.

In order to obviate the objection heretofore urged against film-holders, in which only visible or audible signals were employed to denote when a sufficient quantity of film has been reeled forward for a new exposure, I provide a device, preferably actuated by the film itself adapted to lock the operating-parts when film sufficient for exposure has been wound over the table, preventing further movement of the film until the operator changes or resets the device.

In the present embodiment of this portion of my invention the end of the measuring-roll shaft is extended to the outside of the casing, and on its end is located a collar M, having a pin or projection $m$ thereon, adapted, when the roller is rotated by the passage of film over it, to engage in succession with the notches $n\ n$ in the periphery of a segmental plate N, and turn the latter on its pivot toward the left, the motion of said plate in both directions being limited by pins $n'\ n'$, as shown.

O represents a pivoted detent or dog adapted to be moved by a spring O', so that one end will engage the teeth on wheel I, when permitted, and the other end is operated upon by one end of a lever P, pivoted on the casing. The rear end of lever P is provided with a slight projection $p$, resting upon the top of the segmental plate while the film is being wound off the spool, and co-operating with the notches therein in the nature of a pawl, preventing accidental movement during the operation. When the measuring-roll has made a sufficient number of revolutions to indicate that one exposure of film has been wound over the table E, (each revolution causing the segment to move to the left the space of one tooth,) the end of the segment will have passed from beneath the lever P and permit the latter to drop down, whereupon the spring O', pressing upon the dog O, will cause it to engage the teeth on wheel I and arrest further rotation of the spool, so that no more film can be wound forward until the device is reset after the next exposure. It will be noted, also, that the end of the segment comes in such position when arrested by its outer stop $n'$ that the measuring-roll is arrested, the projection $m$ striking its end if attempt is made to rotate it farther, and then the film may be stretched tightly over E by operating the winding-reel, its pawl preventing backward movement. The resetting is accomplished by raising the outer end of lever P until it is above the path traversed by the segment, and moving the latter to the right until arrested by the inner stop-pin $n'$, which brings the first notch $n$ in position to be entered by the pin $m$, when the measuring-roller is again rotated. This arrest of the spool will be caused after each exposure is reeled forward, the number of notches in the segment and the size of the measuring-roll being relatively adapted so as to cause this result. Still I do not wish to be confined to this particular structure, as other devices could be provided for accomplishing the same purpose.

Q represents an indicator plate or dial formed upon or secured to the casing, having a series of characters thereon preferably indicating the number of exposures of film contained in the holder, and Q' a disk with an indicating-arrow thereon, adapted to be rotated when the film is reeled forward, indicating the number of exposures made and also the amount of film remaining unexposed; and as a convenient means of operating the indicator I secure upon the arbor of the disk Q', upon the inside of the casing, a ratchet-wheel $Q^2$, and extend the arbor of the plate N to the interior of the casing and secure a crank-arm $N^2$ thereon, to which is connected a pawl-arm $N^3$, having the hook $n^3$ at the end, adapted to engage the teeth on wheel $Q^2$, said hook being held in engagement by a spring-finger $n^4$, formed upon the pawl-rod and engaging the inner side of a guiding-loop $n^5$, secured to the casing, as shown in Fig. 6. A detent $q$ is pivoted to the casing and arranged to engage the teeth of the ratchet, preventing accidental backward rotation of the indicator when the pawl is moved forward, being held in engagement by a spring $q'$, secured thereto and operating against a pin $q^2$.

It will be seen from the above that as the segmental plate is gradually moved outward by the operation of the measuring-roll the indicator will be rotated one tooth, and upon the return of the plate to first position the pawl-rod will slide over the teeth of the wheel Q', the detent preventing accidental movement.

Instead of relying upon perforations made in the edge of the film for designating the points at which the film is to be separated into negatives, as heretofore in this class of devices, and of marking the film at each revolution of the measuring-roll, I prefer to mark it only at the points where it is necessary to separate it, so that the operator will not have to count the marks if the measuring-roll is a small one, and whereby, also, a large measuring-roll, such as it is proposed to use in some forms of apparatus, can be dispensed with, thus reducing the depth of the holder. Further, instead of relying upon the puncturing of the film, the burrs formed by which might be smoothed out, I propose to mark the back of the film preferably with ink, and at both sides, so that the liability of severing the film in the wrong place will be reduced.

In the present construction I provide a shaft or rod R near the measuring-roll pivoted upon suitable screws $r$ $r$ in the casing, and secure to it, preferably at opposite ends and near the measuring-roller, metal tubes or chambers R', having their outer ends bent up, as shown, and preferably filled with felt or fibrous material saturated with any suitable ink or coloring-matter, the felt projecting slightly beyond the ends and adapted to touch the under side of the film when the rod is turned on its pivots upon the arrest of the film-spool. This movement of the marking device may be caused in any suitable manner; but I prefer to operate it from the dog O, and to this end I extend the pivot of the latter through the casing and secure upon its inner end a disk S, having a pin $s$ thereon, arranged to engage a rearwardly-extending arm S', attached to rod R and held normally in engagement with said pin by means of a spring $R^3$, operating on its end, as in Fig. 6.

From the above it will be seen that when the dog O is permitted to engage the wheel I and arrest the rotation of the spool the pin $s$ will cause the projection of the markers in contact with the film, causing them to be maintained in this position until the lever P is again supported upon the segmental plate, and the film will be marked at the point at which it is to be severed.

While I have shown two markers, and in practice prefer to employ one at each end of the measuring-roll, this is not essential, as one will answer all purposes.

As an additional means for marking the film at each exposure, and also of determining whether the slide has been withdrawn and the picture taken, I provide suitable markers arranged to be operated by the slide C when moved in or out, consisting in the present instance of one or more spring-plates T, secured to the sides of the opening in front B, having on their inner free ends projections $t$, adapted to co-operate with and puncture the film, and on their rear sides lugs or projections $t'$, projecting, when retracted, in the path of the edges of the slide C, which latter is preferably provided at these points with plates $c^3$, having recesses $c^4$, adapted to be entered by the lugs $t'$ on the plates.

In normal position, when the slide is fully in, the plates T are held away from the paper by their resiliency; but when the slide is withdrawn or moved in so that the front edges of plates $c^3$ pass over the lugs $t'$, they will be moved down and puncture the paper, so that the operator can ascertain before development whether the slide was drawn while a particular portion of film was in proper position for exposure. It is of course only necessary that one of these marking devices be employed; but I prefer two, as by causing the punctures to be of different shape the operator can properly position his negative in the developing-tray so as to watch carefully the development and check any disposition in the image to come up too quickly, as from an over exposure, if necessary.

From the above description the operation of the parts will be readily understood by one skilled in the art. In order to insert the spool of film in the holder, the plate G is turned so as to disengage the arms from the holding-screws and drawn outward. Then the spool is inserted, the slots in the end passing over the lugs $h^3$ $h^3$, and when down far enough the plate G is moved in, the prongs $i$ $i$ entering the wood, and screw J screwed in, centering the spool and drawing the collar $J^2$ tightly against it. Then the plate G is rotated to first position and thereby secured. The end of the film is unwound from the spool and passed over the measuring-roll, across the table, over roller K', and to the winding-reel, to which it is fastened by the clamp. When the first exposure is made, the plates T mark the film, being operated by the slide when drawn out. Then after each exposure the operator rotates the reel and draws the film forward, the measuring-roller moving the segment backward, gradually rotating the indicator Q' to the next indication, and when a sufficient amount has been reeled forward the lever P, dropping off the segment, causes the engagement of the dog O with the wheel I, arresting the spool, and at the same time the ink-marker comes in contact with the rear side of the film and appropriately marks it. The slide C may now be moved in, causing the operation of the markers T, the lever P raised, and the segmental plate moved back to first position, causing the retraction of the dog O and the depression of the markers R'. These operations are gone through with after each exposure, and it will be seen that the liability of the operator's exposing the same portion of the film twice or of reeling forward more or less film than for a single exposure is reduced.

Of course many modifications can be made without departing from the spirit of my invention—as, for instance, all of the operating parts could be placed upon a suitable removable frame located within the casing, as shown in Patent No. 317,050, granted May 5, 1885, to the Eastman Dry Plate and Film Company, and suitable provision made for operating the lever P and segmental plate from the exterior of the casing, and I therefore do not desire to be confined to the particular devices herein shown.

While it is desirable that the arresting devices be attached to the supply-spool, in order that the film may be stretched by a continued rotation of the winding-reel, this is not absolutely essential, as they could be attached to the winding-reel as well and other arrangements made for keeping an even tension on the film—as, for instance, those shown in the before-mentioned patent.

I claim as my invention—

1. In a roller-holder, the combination, with a winding-reel and devices for preventing its backward movement, of a film-supply spool, a locking device therefor, and a measuring-roll for operating said locking device at predetermined times, substantially as described.

2. The combination, with a winding-reel, of a film-supply spool from which the film is unwound, a detent adapted to engage the same to prevent its rotation, and a measuring-roll for causing the operation of the detent, substantially as described.

3. The combination, with a winding-reel, of a film-supply spool from which the film is unwound, a detent adapted to engage the same to prevent its rotation, a support for holding the detent out of engagement with the spool, and a measuring-roll for moving said support, substantially as described.

4. The combination, with a winding-reel, of a film-supply spool, a detent adapted to engage the same to prevent rotation, a spring for operating the detent, a support for holding the detent out of engagement, and a measuring-roll connected to said support to move it out of the way, substantially as described.

5. The combination, with a film-containing roller, of a measuring-roll having a projection or pin thereon, a movable plate with which the pin co-operates, and a stop for limiting the motion of the plate, substantially as described.

6. The combination, with a film-containing roller, of a measuring-roll having a projection or pin thereon, a movable plate having one or more notches in which the projection operates, a detent arranged to co-operate with and arrest the movement of the roller, and a stop resting upon the plate and connected with the detent operating to release the latter, substantially as described.

7. The combination, with the film-containing roller, of a measuring-roll having a projection or pin thereon, a movable plate having one or more notches in which the projection operates, a detent for engaging the roller and preventing rotation thereof, and a pivoted lever, one end engaging the plate and the other the detent, substantially as described.

8. The combination, with the spool and a center on which one end is supported, of the plate longitudinally movable in the casing, the sleeve mounted on the plate, having the spurs or projections on its end, and the screw passing through the sleeve and engaging the spool, substantially as described.

9. The combination, with the spool and a center on which one end is supported, of the plate longitudinally movable in the casing, the sleeve mounted on the plate, having the toothed wheel, and the spurs or projections on its inner end for engaging the spool, the screw passing through the sleeve and entering the spool, and the detent for engaging the toothed wheel, substantially as described.

10. The combination, with the spool and a center on which one end is supported, of the plate movable in the casing and having the open slots, the movable center having the projections thereon for engaging the spool, and the headed pins with which the slotted portions of the plate co-operate, substantially as described.

11. The combination, with the measuring-roll having the projection thereon, the movable notched plate with which it co-operates, and the pawl connected to the plate, of the movable indicator and the ratchet-wheel thereon with which the pawl engages, substantially as described.

12. In a roller-holder such as described, the combination, with a film-support, of an ink-marker arranged to mark the film without perforating it upon the rear side, a measuring-roll, and connection between the roll and marker for operating the latter when a sufficient amount of film has passed over the roll to form an exposure, as set forth.

13. In a roller-holder such as described, the combination, with a film-support, of a measuring-roll, a film-marking device independent of the roll, and connections between the roll and marker for causing the operation of the latter when film sufficient for one exposure has been reeled forward, as set forth.

14. In a roller-holder such as described, the combination, with a film-support, of a measuring-roll, an independent pivoted film-marker, and connections between the roll and marker for causing the operation of the latter from the former, as set forth.

15. In a roller-holder such as described, the combination, with the measuring-roll, the two oscillating film-markers, one at each side of the film, connected for simultaneous operation, and connections between said markers and the measuring-roll for causing their oscillation by the rotation of the latter, as set forth.

16. In a roller-holder such as described, the combination, with a film-support, of a film-marker embodying an oscillating tube containing a marking-fluid arranged to make contact with the film, as set forth.

17. In a roller-holder such as described, the combination, with a film-support, of a film-marker embodying an oscillating tube containing fibrous material saturated with marking-fluid arranged to make contact with the film, as set forth.

18. In a roller-holder such as described, the combination, with the measuring-roll and a film-containing roller, of a detent co-operating with the roller to arrest its rotation, a marker arranged to operate on the film, and connections between the measuring-roll, detent, and marker whereby the two latter will be operated from the former, substantially as described.

19. In a roller-holder such as described, the combination, with the measuring-roll and film-containing roller, of the oscillating detent for co-operating with the roller, the projection thereon, and the film-marker co-operating with said projection, a spring for operating said detent, a plate for holding the latter out of engagement, and connections between the measuring-roll and plate for causing the release of the detent, as set forth.

20. In a roller-holder such as described, the combination, with the supply-spool, the pivoted detent for co-operating therewith, a spring for operating it, and a projection eccentric to its center, of a pivoted film-marker having the arm engaging the projection and a spring for retracting it, as set forth.

21. In a roller-holder such as described, the combination, with a supply-spool, a detent co-operating therewith, and its operating-spring, of a measuring-roll having the projection, a notched plate, a lever engaging said plate and detent, an indicator, and a pawl for operating said indicator connected to the plate, as set forth.

22. In a roller-holder such as described, the combination, with film carrying and feeding devices embodying a film-containing supply-spool, of a detent arranged to engage said spool, and a measuring-roll connected to and operating said detent, thereby arresting the spool and permitting the film to be strained, substantially as described.

23. In a roller-holder such as described, the combination, with the film carrying and feeding devices, of a detent arranged to lock said parts from operation connected to and operated by the measuring-roll, as set forth.

24. In a film-holder, the combination of the two film-markers arranged at opposite sides of the film, having their operating portions of different shapes, whereby the top and bottom of the film are designated, substantially as described.

25. In a roller-holder, the combination, with a supply-spool, a detent for arresting it, and a measuring-roll operating said detent, of a winding-reel having a ratchet thereon and a pawl co-operating therewith, substantially as described.

26. In a roller-holder, the combination, with a supply-spool and a detent for arresting it, of a winding-roller and a device for preventing its backward rotation, substantially as described.

27. In a roller-holder, the combination, with film carrying and feeding devices and a measuring-roll, of a detent operated from the measuring-roll for arresting the film-feeding devices, and a counter or indicator operated from the measuring-roll as the film is wound forward, substantially as described.

28. In a roller-holder, the combination, with film carrying and feeding devices and a measuring-roll, of a detent for arresting the film, a film-marking device, and a counter or indicator, all connected to and operated by the measuring-roll, substantially as described.

29. In a roller-holder, the combination, with film carrying and feeding devices and a measuring-roll, of a film-marking device independent of the roll, and a counter or indicator, and connections between the measuring-roll, marker, and indicator, whereby the operation of the last two will be caused by the former, substantially as described.

30. In a roller-holder, the combination, with the film carrying and feeding devices and a measuring-roll, of a movable plate operated by the measuring-roll, a detent for arresting the film-feeding devices, and an indicator or counter connected to and operated by the movable plate, substantially as described.

THOMAS TAYLOR.

Witnesses:
ALEXANDER D. YOUNG,
ROBERT WYLIE.